(12) United States Patent
Huber

(10) Patent No.: US 11,985,491 B2
(45) Date of Patent: May 14, 2024

(54) EVALUATION DEVICE AND METHOD FOR ANALYZING A PUBLIC ADDRESS SYSTEM, AND PUBLIC ADDRESS SYSTEM

(71) Applicant: Robert Bosch GmbH, Stuttgart (DE)

(72) Inventor: Bastian Huber, Stephansposching (DE)

(73) Assignee: Robert Bosch GmbH, Stuttgart (DE)

( * ) Notice: Subject to any disclaimer, the term of this patent is extended or adjusted under 35 U.S.C. 154(b) by 214 days.

(21) Appl. No.: 17/627,179

(22) PCT Filed: Jul. 8, 2020

(86) PCT No.: PCT/EP2020/069286
§ 371 (c)(1),
(2) Date: Jan. 14, 2022

(87) PCT Pub. No.: WO2021/008976
PCT Pub. Date: Jan. 21, 2021

(65) Prior Publication Data
US 2022/0286779 A1 Sep. 8, 2022

(30) Foreign Application Priority Data
Jul. 15, 2019 (DE) .................... 10 2019 210 414.2

(51) Int. Cl.
*H04R 5/04* (2006.01)
*G06N 3/02* (2006.01)
(Continued)

(52) U.S. Cl.
CPC ................. *H04R 5/04* (2013.01); *G06N 3/02* (2013.01)

(58) Field of Classification Search
None
See application file for complete search history.

(56) References Cited

U.S. PATENT DOCUMENTS

2009/0274312 A1* 11/2009 Howard ............... H04R 29/003
381/58
2015/0304772 A1* 10/2015 Risberg .................. H04R 3/007
381/55
(Continued)

FOREIGN PATENT DOCUMENTS

EP           3316595 A1    5/2018
WO        2008036992 A1    4/2008

OTHER PUBLICATIONS

Maladkar, Kishan "Overview of Recurrent Neural Networks and Their Applications". https://analyticsindiamag.com/overview-of-recurrent-neural-networks-and-their-applications/ 18 pages. Jan. 17, 2018. (Year: 2018).*

(Continued)

*Primary Examiner* — Qin Zhu
(74) *Attorney, Agent, or Firm* — Michael Best & Friedrich LLP

(57) ABSTRACT

The invention relates to an evaluation device (6) for analysing a public address system (1), the public address system (1) comprising at least one loudspeaker (3a-3d) and at least one audio signal output unit (4), the loudspeaker (3a-3d) having an impedance plot (10), the evaluation device (6) comprising a neural network (11), the neural network (11) being trained to determine a loudspeaker type on the basis of an impedance plot (10), the evaluation device (4) being provided with the impedance plot (10) of the loudspeaker (3a-3d) and an additional parameter, and the evaluation device being designed to analyse the loudspeaker (3a-3d) and/or determine the loudspeaker type by means of the neural network (11) on the basis of the provided impedance plot (10) and the additional parameter.

11 Claims, 3 Drawing Sheets

(51) Int. Cl.
*H04R 3/12* (2006.01)
*H04R 29/00* (2006.01)

(56) References Cited

U.S. PATENT DOCUMENTS

2016/0329867 A1\* 11/2016 Lesso .................... H03F 1/3241
2018/0122401 A1\* 5/2018 Iyer ........................ G10L 25/30

OTHER PUBLICATIONS

Translation of International Search Report for Application No. PCT/EP2020/069286 dated Oct. 19, 2020 (2 pages).

\* cited by examiner

EVALUATION DEVICE AND METHOD FOR ANALYZING A PUBLIC ADDRESS SYSTEM, AND PUBLIC ADDRESS SYSTEM

BACKGROUND OF THE INVENTION

An evaluation device for analyzing a public address system is proposed. The public address system comprises a plurality of loudspeakers and at least one audio signal output unit. The loudspeaker has an impedance plot. The evaluation device is designed to determine a loudspeaker type.

Public address systems have a wide variety of uses, for example in buildings for information and/or warning purposes, but also in live sound events (touring) for music reproduction. In large public address systems, the installers of the public address systems put in a substantial effort to verify the wiring and configuration of the public address system. If the wiring or its verification is incorrect, this can result not only in poor reproduction, but also in destruction of the loudspeakers.

The installer usually wires the loudspeakers to the amplifier when installing the public address system. The wiring normally takes place with system cables. The installer then uses the device control on the device to load the amplifier channels with the correct loudspeaker settings. This is necessary, for example, in order to apply the appropriate limiter settings and filters. As soon as these settings are loaded, the installer checks that the real cabling matches the loaded settings. Do this, for example, amplifier channels are muted in order to perform a sound check on each channel individually through activation. A procedure of this type is particularly time-consuming and also highly susceptible to errors. It cannot be ensured, for example, that the correct loudspeaker settings are loaded in the manual application.

SUMMARY OF THE INVENTION

An evaluation device is proposed for analyzing a public address system. A public address system, a method for analyzing a public address system, a computer program and a storage medium are further proposed.

An evaluation device for analyzing a public address system is proposed. The evaluation device can comprise a hardware device, or alternatively the evaluation device can be designed as and/or can comprise a software module. The evaluation device can be designed, for example, for integration into the public address system, in particular into a mixing console or into a limiter. The analysis is, for example, an analysis for commissioning the public address system or an analysis of the cabling and/or verification of the public address system. Along with the type and/or topology of the cabling, the analysis can also comprise an integrity check on the public address system. The public address system is designed, for example, as a warning system for emitting an audible signal and/or a warning signal. The public address system can further represent an announcement system, for example in a department store or in a public building. It is furthermore possible, for example, for the public address system to be designed as a concert public address system. The evaluation device has a data connection, an electrical connection and/or a signaling connection to the public address system.

The public address system has at least one loudspeaker, preferably more than ten, and especially more than 200 loudspeakers. The loudspeakers can be of different types, also referred to as loudspeaker types. The loudspeaker types can differ in terms of their function, for example subwoofers or tweeters. The loudspeaker types can further differ in terms of different makes, manufacturer types and/or parameter ranges. The public address system further has a least one audio signal output unit. The audio signal output unit is designed, for example, as a mixing console, an amplifier or a sound generator device. The audio signal output unit can comprise, in particular, a limiter and preferably an analog-to-digital or digital-to-analog converter. The audio signal output unit is designed, in particular, to output an audio signal, and the audio signal can be designed as an analog or digital audio signal. In particular, the audio signal output unit has a signaling connection to the public address system. This connection is preferably a wiring, for example cabling.

The loudspeakers have an impedance plot. The impedance plot is, in particular, in each case characteristic of the loudspeakers. The impedance plot is understood to mean, for example, the impedance curve. The impedance plot is understood to mean, in particular, the plot of the impedance depending on frequency. The impedance plot is designed, for example, for a settable and/or preset frequency band. The impedance plot can be determined for coherent or incoherent frequency bands. The impedance plot of the loudspeaker is to be understood to mean, in particular, the impedance plot in the acoustic frequency range.

The evaluation device has a neural network. A neural network is understood to mean, in particular, a deep neural network. The neural network has nodes, wherein the nodes describe, for example, weightings for the further processing of a signal. The neural network is trained and/or trainable to determine a loudspeaker type on the basis of an impedance plot. The neural network is trained, for example, that the impedance plot is provided as an input signal to the neural network, and the neural network, particularly in the layers and/or by means of the nodes, assesses and/or evaluates the impedance plot in order to determine a loudspeaker type on the basis thereof. The loudspeaker type is, for example, the type designation, the functional type and/or a performance type. The neural network can be designed, for example, to determine the loudspeaker type as a probability distribution, wherein the probability distribution indicates the probability with which a specific loudspeaker type occurs. The neural network is to be understood, in particular, as a classifier. The neural network can represent a trained neural network, or alternatively and/or additionally the neural network can be further trained in the course of the operation of the evaluation device, wherein the impedance plot of the loudspeaker(s) of the public address system is provided to the evaluation device. The impedance plot is provided, for example, as a dataset. At least one additional parameter is further provided to the evaluation device for the training of the neural network. In particular, a plurality of additional parameters, for example more than five or ten additional parameters, are provided to the evaluation device. The additional parameter is assigned, in particular, to an impedance plot and/or to a loudspeaker. Different additional parameters, for example, preferably of the same kind and/or the same type, can be provided in each case to the evaluation device for a plurality of provided impedance plots from different loudspeakers.

The evaluation device is designed to analyze the loudspeaker type and/or to determine the loudspeaker type by means of the neural network and on the basis of the impedance plot and an associated additional parameter which is, in particular, measured and/or input by a user. The neural network can be designed, for example, to determine the loudspeaker type and/or its cabling for all provided impedance plots and the respective additional parameter. The probability of the presence of a particular loudspeaker type, for example, is determined for this purpose. In addition, the evaluation device can be designed to provide information relating to the specific loudspeaker type, for example operating facilities, possible operating parameters, limiter parameters, connection types, settings and/or cabling types such as parallel or in series.

The invention is based on the notion of providing an evaluation device which can quickly analyze a public address system and/or determine its cabling on the basis of a neural network. In particular, a misinterpretation by the user or installer is excluded through a use of the neural network. In particular, the invention is based on the notion that the impedance plot can change over time, for example during operating times, or on the basis of environment parameters, and the parameters are to be used for reliable assessment by means of an evaluation device. A particularly meaningful evaluation device for analyzing the public address system is thus provided.

It is optionally provided that the additional parameter comprises and/or describes an ambient temperature of the loudspeaker. The ambient temperature has an influence, for example, on resistance and therefore on maximum operating voltages. The additional parameter can further comprise and/or describe an operating temperature of the loudspeaker. The operating temperature can represent, in particular, a time-dependent operating temperature and can, for example, take into account that the loudspeaker has warmed up over the operating period. The additional parameter can further comprise and/or describe a relative humidity of the environment of the loudspeaker. The additional parameter especially comprises and/or describes the age of the loudspeaker and/or a previous service life of the loudspeaker. The additional parameter can further comprise a number of parallel-connected loudspeakers, for example a number of parallel-connected loudspeakers per connected channel. A particularly meaningful evaluation and/or analysis of the public address system and/or its cabling is possible on the basis of these additional parameters.

The impedance plot is particularly preferably designed and/or measured as a complex-value impedance plot. The complex-value impedance plot takes account, in particular, of a phase shift. A more meaningful analysis of the public address system is possible through the use of the complex-value impedance plot.

One design of the invention provides that the evaluation device comprises a measuring device. The measuring device can be designed, for example, as a measuring sensor or measuring chip. The measuring device can especially form part of the loudspeaker and/or the audio signal output unit. The measuring device is designed to determine the impedance and/or the complex impedance on the basis of an audio signal and/or a sweep signal. The measuring device is designed, for example, to apply an audio signal and/or sweep signal in each case to the outputs of the audio signal output unit and to determine the impedance of the loudspeakers on this output. The audio signal and/or the sweep signal is located, in particular, in the audible frequency range.

One design of the invention provides that the loudspeaker is connected by means of a wiring to an output of the audio signal output unit. The wiring is to be understood, in particular, as a cable. The wiring and/or the cable has, in particular, a resistance and/or an impedance. The impedance plot which is provided to the neural network for the analysis and/or determination of the loudspeaker type comprises, in particular, the impedance of the wiring and/or of the output. The measuring device is arranged, for example, in the output or in the audio signal output unit, wherein, for example, the impedance of the output, the wiring and the loudspeaker is measured by the arrangement as a total impedance. In particular, the impedance plot can also be designed as a corrected impedance plot, the impedance plot being designed, for example, to determine a measured impedance plot through correction of a wiring impedance and/or output impedance.

It is particularly preferred that the output unit has a plurality of outputs. The audio signal output unit is designed, for example, as a mixing console or as a limiter having a plurality of outputs. The outputs can be connected in each case to one or more loudspeakers. The evaluation device is designed to determine, in the neural network and in the additional parameter, which output is connected to which loudspeaker and/or loudspeaker type on the basis of the measured impedance plot. The measured impedance plots of the individual outputs are provided, for example, successively to the neural network for this purpose, wherein the loudspeaker or the loudspeaker types are thus determined for each output on the basis of these impedance plots.

It is particularly preferred that the public address system has a plurality of loudspeakers. The loudspeakers are wired to the audio signal output unit. The public address system and/or the wiring describes, for example, a topology of the public address system. A wiring model is provided to the evaluation device. The wiring model can be provided, for example, by the user and/or installer. The wiring model comprises and/or describes the topology of the public address system and/or the wiring. The wiring model is provided to the neural network, the evaluation device. The evaluation device is designed to verify and/or correct the wiring module on the basis of the wiring model, the additional parameter and the impedance plot. The evaluation device checks, for example, whether the loudspeaker types and/or wiring matches the wiring model wherein, if they do not match, the wiring model is preferably updated and corrected by the evaluation device.

It is optionally provided that the evaluation device is designed to load a loudspeaker setting and/or limiter setting on the basis of an analysis and/or the detected loudspeaker type. The evaluation device can, for example, directly load the settings for the corresponding loudspeaker type which are required for the operation thereof. The loudspeaker setting and/or limiter setting can be performed, in particular, taking into account the wiring model.

A public address system forms a further subject-matter of the invention. The public address system comprises at least one, preferably more than five and especially more than ten loudspeakers. The public address system further comprises an audio signal output unit. The audio signal output unit has, in particular, a signaling connection to the loudspeaker(s). The audio signal output unit comprises outputs, for example, wherein the outputs are connected to one or more loudspeakers. The connection is established, for example, as a wiring and/or as a cable. The public address system comprises an evaluation device as previously described. The evaluation device is designed to analyze the public address system, to detect a loudspeaker and/or to determine the loudspeaker type. To do this, the evaluation device comprises the neural network, wherein an impedance plot of the loudspeaker or a plurality of impedance plots of the loudspeakers are provided to the evaluation device. The loudspeaker type is determined by the evaluation device together with one or more additional parameters. The evaluation device determines, in particular, which output of the audio signal output unit is connected to which loudspeaker type. In particular, the topology of the public address system can be determined by means of the evaluation device.

It is particularly preferred that the public address system comprises a measuring device. The measuring device is arranged, for example, in the audio signal output unit and/or in an output of the audio signal output unit. The measuring device is designed to determine the impedance plot of the loudspeaker(s). In particular, the measuring device has a data connection and/or signaling connection to the evaluation device in order to provide the impedance plot to the evaluation device.

A method for analyzing the public address system forms a further subject-matter of the invention. The method can be implemented, for example, as a software module. The method provides that the loudspeaker type is determined by means of a neural network and a measured impedance plot together with an additional parameter. The neural network is trained, for example, to evaluate impedance plots and, together with additional parameters, to determine the loudspeaker type. The temperature of the environment and/or of the loudspeaker, the relative humidity and/or the age of the loudspeaker, for example, serve as additional parameters. The additional parameters can be entered manually, for example, by a user, or the additional parameters are alternatively and/or additionally determined by means of a measuring device. The method is designed, in particular, for application and/or execution by the evaluation device.

A computer program forms a further subject-matter of the invention, wherein the computer program comprises a program code. The computer program is designed, when executed on a computer, the evaluation device and/or the public address system, to carry out the method as previously described for analyzing the public address system. In particular, the computer program comprises and/or describes the neural network.

A storage medium, for example a CD, DVD or flash memory, comprises a further subject-matter of the invention. The storage medium comprises the computer program. The computer program and/or the program code of the computer program is stored on the storage medium.

BRIEF DESCRIPTION OF THE DRAWINGS

Further advantages, effects and designs of the invention are set out in the attached figures and their description, wherein.

DETAILED DESCRIPTION

Figure 1:
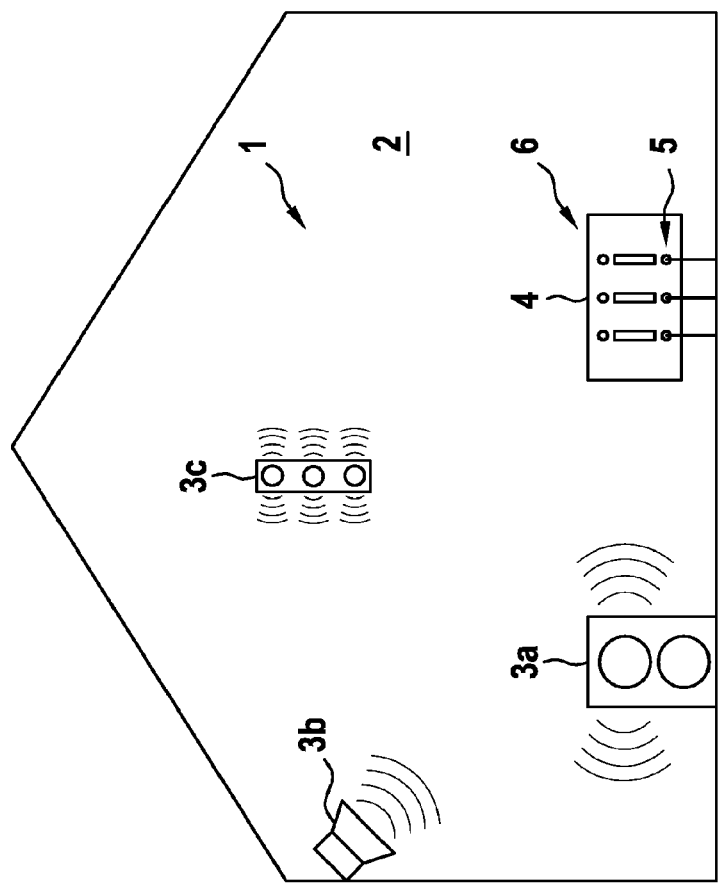
FIG. 1: shows an example embodiment of a public address system.

FIG. 1 shows schematically a public address system 1. The public address system is a public address system inside a building 2, for example a concert hall. The public address system comprises a plurality of loudspeakers 3a, 3b and 3c. The loudspeakers 3a-3c are arranged as spatially distributed and are designed, in particular, as different loudspeaker types. The loudspeaker 3a, for example, comprises a subwoofer, the loudspeaker 3b comprises a tweeter and the loudspeaker 3c comprises a multifunction loudspeaker. The loudspeaker types can also manifest themselves, in particular, as manufacturer types. The loudspeaker types 3a-3c in each case have, in particular, different operating parameters, for example maximum or minimum usable audio frequencies.

The loudspeakers 3a-3c have a signaling connection to an audio signal output unit 4. The audio signal output unit 4 is designed, for example, as a mixing console. The audio signal output unit 4 has a plurality of outputs 5. The outputs 5 are connected in each case by means of a wiring, for example a cable, to one or more of the loudspeakers 3a-3c. The audio signal output unit 4 has an evaluation device 6. The evaluation device 6 is designed to analyze the public address system 1 on the basis of a neural network, an additional parameter and impedance plots 10 (FIG. 2) of the loudspeakers 3a-3c and especially to assign a loudspeaker type to the impedance plots 10 and/or outputs. The evaluation device 6 is designed, for example, to analyze the loudspeakers connected to each of the outputs 5. The impedance plot 10 of the loudspeakers 3a-3c connected in each case to the outputs 5 is determined. An additional parameter, for example, is further determined, or alternatively the additional parameter is entered by the installer or user. The additional parameter is, for example, the ambient temperature, the relative humidity of the environment and/or the age of the loudspeakers 3a-3c. The measured impedance plots 10 and additional parameters are processed and analyzed by the evaluation device within and/or by means of a neural network. The evaluation device 6 is designed to output the loudspeaker type so that the evaluation device 6 in each case assigns the connected loudspeaker type to the outputs 5.

Figure 2:
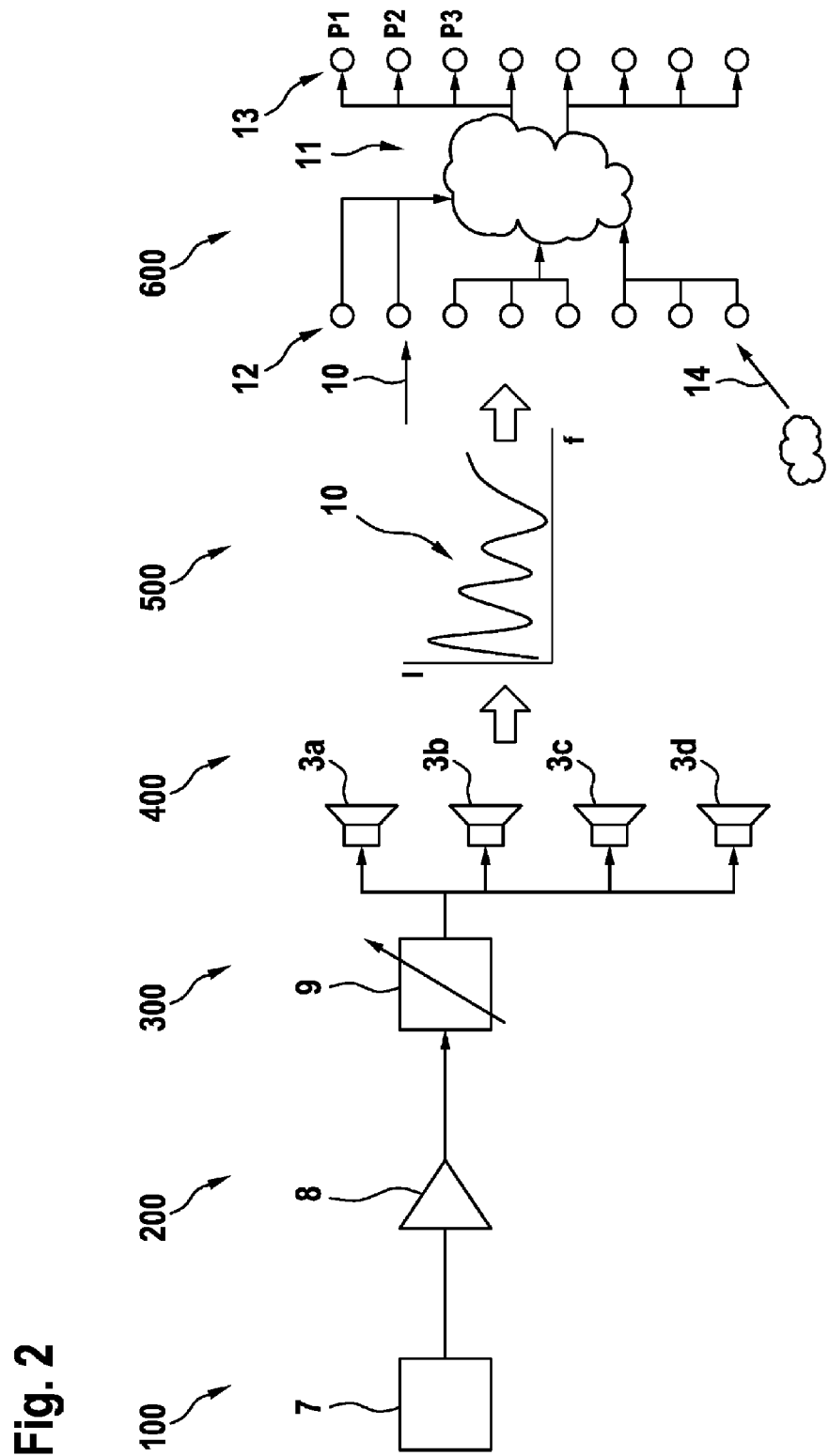
FIG. 2: shows an example embodiment of method steps of the method and/or in the evaluation device.

FIG. 2 shows, by way of example, the steps which the evaluation device 6 from FIG. 1 has to carry out. In a first method step 100, an audio signal, also referred to as a measurement signal, is generated. This can be performed, for example, by means of a signal generator 7. The audio signal and/or measurement signal is preferably a sweep signal. The frequency range of the sweep signal covers, in particular, the audible frequency range. The audio signal and/or measurement signal is fed to an amplifier 8. In a method step 200, the audio signal and/or measurement signal is amplified by means of the amplifier 8. The amplified signal is provided to a measuring device 9. In a method step 300, the measuring device controls the different loudspeakers 3a-3c, for example by activating or deactivating the outputs 5.

In the method step 400, the loudspeakers 3a-3d are operated successively with the amplified audio signal and/or measurement signal. The measuring device records the impedance plot 10 of the respective loudspeaker. In the method step 500, the impedance plot 10 is determined. The impedance plot 10 is the plot of the impedance I depending on frequency. The impedance plot 10 can be stored, for example, in the method step 500. The impedance plot 10 is processed in a method step 600. The method step 600 is carried out, in particular, in the evaluation device 6. In the method step 600, the impedance plot 10 is provided to the neural network 11. The neural network 11 comprises an input layer 12 and an output layer 13. The output layer 13 is provided to the impedance plot 10. A plurality of concealed layers are located between the input layer 12 and the output layer 13, the concealed layers comprising, in particular, a plurality of nodes.

In the method step 600, an additional parameter 14 is further provided to the neural network 11. The additional parameter is, for example, an ambient temperature or the age of the loudspeaker. The neural network is designed to evaluate the impedance plot 10 together with the additional parameter 14. The neural network 11 outputs a probability P1, P2, P3 at the output layer 13. The probabilities P1, P2 and P3 correspond, for example, to the probabilities of a loudspeaker type being disposed on a specific output. The probability P1, for example, is 90% here, the probability P2 is 0% and the probability P3 is 10%. The evaluation device is then designed to use the most probable loudspeaker type as the existing loudspeaker type. In particular, a safeguarding mechanism can be provided, whereby, for example, a loudspeaker type is assumed to be present only with a certain minimum probability, e.g. 75%.

Figure 3:
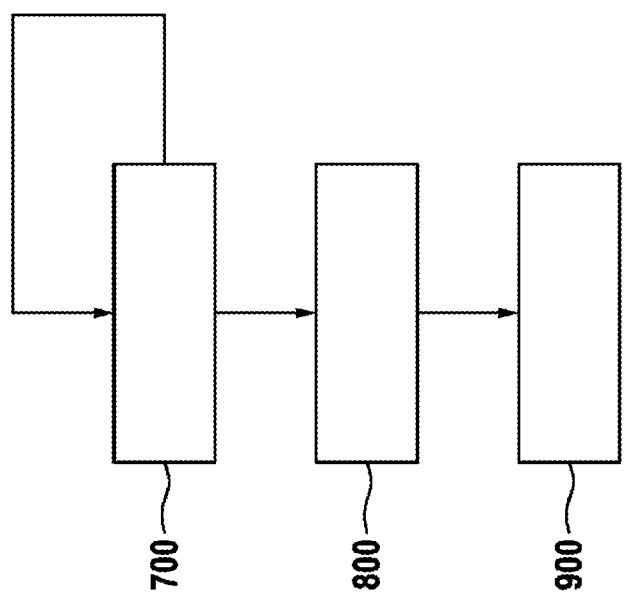
FIG. 3: shows a schematic method sequence for training and operating the neural network.

FIG. 3 shows, by way of example, a method for training and operating the neural network 11. In the method step 700, for example, impedance plots 10 are measured for loudspeaker types. In particular, the impedance plot 10 is determined for different values of additional parameters for each loudspeaker type. For this purpose, identical loudspeaker types are determined, for example, at different ambient temperatures, operating temperatures, ages, service lives and/or relative humidities. In the method step 800, the neural network 11 is trained on the basis of the measured impedance plots 10 using different additional parameters. The training of the neural network 11 can also be understood as a design of the neural network. In particular, in the method step 800, the design also corresponds to a training of the neural network with a multiplicity of measured impedance plots. In particular, the training of the neural network can also be performed "on-the-fly" during the operation of the evaluation device.

The method step 900 essentially corresponds to the performance of the method steps 100-600 in FIG. 2, i.e. the application of the neural network 600 with prior measurement of the respective impedance plots. The output of the probabilities P1-Pn, for example, can be the result of the method step 900.

The invention claimed is:

1. An evaluation device for analyzing a public address system,
wherein the public address system has at least one loudspeaker and at least one audio signal output unit, wherein the loudspeaker has an impedance plot,
wherein the evaluation device comprises a neural network, wherein the neural network is trained to determine a loudspeaker type on the basis of an impedance plot and an additional parameter, and
wherein the impedance plot of the loudspeakers and the additional parameter are provided to the evaluation device, wherein the evaluation device is designed to analyze the loudspeaker and/or to determine the loudspeaker type by means of the neural network on the basis of the provided impedance plot and the additional parameter, wherein the additional parameter comprises an ambient temperature of the loudspeaker, an operating temperature of the loudspeaker, a relative humidity of the environment of the loudspeaker, and/or an age of the loudspeaker and/or the number of parallel-connected loudspeakers.

2. The evaluation device as claimed in claim 1, wherein the impedance plot forms a complex-value impedance plot.

3. The evaluation device as claimed in claim 1, further comprising a measuring device, wherein the measuring device is designed to determine the impedance plot on the basis of an audio signal and/or a sweep signal.

4. The evaluation device as claimed in claim 1, wherein the loudspeaker is connected by means of a wiring to an output of the audio signal output unit, wherein the impedance plot comprises the impedance of the wiring and the impedance of the output.

5. The evaluation device as claimed in claim 1, wherein the audio signal output unit has a plurality of outputs, wherein the evaluation device is designed to determine, by means of the neural network, which output is connected to which loudspeaker type.

6. The evaluation device as claimed in claim 1, wherein the public address system has a plurality of loudspeakers, wherein the loudspeakers are wired to the audio signal output unit, wherein a wiring model is provided to the evaluation device and is designed to verify the wiring model on the basis of the wiring model, the neural network and impedance plots.

7. The evaluation device as claimed in claim 1, wherein the evaluation device is designed to load a loudspeaker setting and/or limiter setting on the basis of the analysis and/or the loudspeaker type.

8. A public address system having at least one loudspeaker, an audio signal output unit and the evaluation device as claimed in claim 1, wherein the evaluation device is designed to determine the loudspeaker type on the basis of an impedance plot of the loudspeaker and the number of parallel-connected loudspeakers.

9. The public address system as claimed in claim 8, further comprising a measuring device, wherein the measuring device and/or the evaluation device is comprised of the audio signal output unit.

10. A method for analyzing a public address system, having at least one loudspeaker, the method comprising:
determining a loudspeaker type via a neural network and a measured impedance plot together with an additional parameter, wherein the additional parameter comprises a number of parallel-connected loudspeakers, and wherein the neural network is trained to determine the loudspeaker type on the basis of the impedance plot and the additional parameter.

11. A non-transitory, computer-readable medium containing instructions that when executed by a computer cause the computer to control a public address system that has at least one loudspeaker and at least one audio signal output unit, wherein the loudspeaker has an impedance plot, by
determining a type of the at least one loudspeaker via a neural network and a measured impedance plot together with an additional parameter, wherein the additional parameter comprises an ambient temperature of the loudspeaker, an operating temperature of the loudspeaker, a relative humidity of the environment of the loudspeaker, and/or an age of the loudspeaker and/or the number of parallel-connected loudspeakers, and wherein the neural network is trained to determine a loudspeaker type on the basis of the impedance plot and the additional parameter.

* * * * *